(12) United States Patent
Kuroki et al.

(10) Patent No.: US 8,708,084 B2
(45) Date of Patent: Apr. 29, 2014

(54) BICYCLE WITH AUXILIARY POWER UNIT

(75) Inventors: Masahiro Kuroki, Saitama (JP);
Kentaro Ikegami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 13/211,512

(22) Filed: Aug. 17, 2011

(65) Prior Publication Data
US 2012/0048634 A1 Mar. 1, 2012

(30) Foreign Application Priority Data

Aug. 30, 2010 (JP) .................................. 2010-192754

(51) Int. Cl.
*B62M 6/40* (2010.01)

(52) U.S. Cl.
USPC .................. 180/206.1; 180/205.1; 180/206.2; 180/206.3; 180/206.4

(58) Field of Classification Search
USPC .......... 180/205.1, 205.2, 205.3, 205.4, 205.5, 180/205.6, 205.7, 205.8, 220, 206.1, 206.2, 180/206.3, 206.4, 206.5, 206.6, 206.7, 180/206.8; 280/212
See application file for complete search history.

(56) References Cited

U.S. PATENT DOCUMENTS

| | | | |
|---|---|---|---|
| 5,570,752 A * | 11/1996 | Takata ........................ | 180/206.4 |
| 6,073,717 A * | 6/2000 | Yamamoto et al. ........ | 180/206.4 |
| 6,276,479 B1 * | 8/2001 | Suzuki et al. .............. | 180/206.8 |
| 8,205,705 B2 * | 6/2012 | Li et al. ...................... | 180/206.4 |
| 2011/0168472 A1 * | 7/2011 | Li et al. ...................... | 180/206.4 |

FOREIGN PATENT DOCUMENTS

| | | |
|---|---|---|
| EP | 0798204 A1 | 10/1997 |
| JP | 2000/335476 A | 12/2000 |
| JP | 3499138 B2 | 2/2004 |
| JP | 3642364 B2 | 4/2005 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP (57) ABSTRACT

A power-assisted bicycle with an auxiliary power unit that improves positional stability of a torque sensor and inhibits the position of the sensor from being misaligned, wherein the power-assisted bicycle includes an annular hollow member inserted over an outer periphery of a crankshaft and a one-way clutch disposed on the hollow member for transmitting, when a pedaling torque in a direction in which the power-assisted bicycle traveling in a forward direction, is applied to the crankshaft, and wherein a magnetic film is formed in a recess disposed in an outer periphery of the hollow member, and a magnetostrictive torque sensor is positioned and fixed by a support member for rotatably supporting the magnetostrictive torque sensor relative to the annular hollow member at both ends of the recess, such that the magnetostrictive torque sensor faces the magnetic film in the recess.

20 Claims, 7 Drawing Sheets

BICYCLE WITH AUXILIARY POWER UNIT

CROSS-REFERENCE TO RELATED APPLICATIONS

The present application claims priority under 35 USC 119 to Japanese Patent Application No. 2010-192754 filed on Aug. 30, 2010 the entire contents of which are hereby incorporated by reference.

BACKGROUND OF THE INVENTION

1. Field of the Invention

The present invention relates to a bicycle with an auxiliary power unit intended to improve stability for the positioning of a sensor used for detecting a pedaling torque.

2. Description of Background Art

A magnetostrictive torque sensor is known that is disposed adjacent to a hollow member on an outer periphery of a crankshaft in order to detect a pedaling torque applied by a rider. More specifically, as disclosed in Japanese Patent No. 3499138, a magnetic film is fixed to an outer peripheral surface of a hollow member on an outer periphery of a crankshaft with a magnetostrictive torque sensor is fixed on a casing side so as to face the magnetic film.

In addition, as disclosed in Japanese Patent No. 3642364, a magnetic film is fixed to an outer peripheral surface of a hollow torque transmitting member on an outer periphery of a crankshaft with a magnetostrictive torque sensor is disposed so as to face the magnetic film. The magnetostrictive torque sensor is disposed between the hollow torque transmitting member and an auxiliary power unit casing.

However, in the related art disclosed in Japanese Patent No. 3499138, the hollow member that produces magnetostriction is rotatably supported by a plurality of bearings relative to the casing and the magnetostrictive torque sensor is fixed to the casing side. This causes the magnetostrictive torque sensor and the magnetic film to be misaligned in a thrust direction, which makes it difficult to stabilize the position of the magnetostrictive torque sensor relative to the magnetic film.

In the related art disclosed in Japanese Patent No. 3642364, the magnetostrictive torque sensor is supported between the hollow torque transmitting member and the auxiliary power unit casing. It is nonetheless likely that the magnetostrictive torque sensor and the magnetic film will be misaligned in a thrust direction, so that the magnetostrictive torque sensor is not sufficiently stable relative to the position of the magnetic film.

SUMMARY AND OBJECTS OF THE INVENTION

The present invention has been made to solve the foregoing related art problems. It is an object of an embodiment of the present invention to provide a bicycle with an auxiliary power unit that improves the positional stability of a torque sensor and inhibits the position of the sensor from being misaligned.

According to an embodiment of the present invention, there is provided a bicycle with an auxiliary power unit (10) including control means (54) for controlling an output of a motor (50) according to a torque value of a pedaling torque applied to a crankshaft (38) as detected by a torque sensor (80). The bicycle (10) includes an annular hollow torque transmitting member (72) inserted over an outer periphery of the crankshaft (38); and a one-way clutch (78), disposed on the hollow torque transmitting member (72), for transmitting, when a pedaling torque in a direction in which the bicycle with an auxiliary power unit (10) travels in a forward direction is applied to the crankshaft (38), the pedaling torque to a drive wheel (WR). In the bicycle (10), a magnetic film (84) is formed in a recess (110) disposed in an outer periphery of the hollow torque transmitting member (72); and the torque sensor (80) is positioned and fixed by a support member (82) for supporting the torque sensor (80) rotatably relative to the hollow torque transmitting member (72) at both ends of the recess (110) such that the torque sensor (80) faces the magnetic film (84) in the recess (110).

According to an embodiment of the present invention, the hollow torque transmitting member (72) has a protrusion (122, 208) disposed on a first end thereof; and the protrusion (122) and the support member (82) abut on each other to thereby position and fix the torque sensor (80).

According to an embodiment of the present invention, the support member (82) includes a first member (116) and a second member (118) disposed on either end side of the torque sensor (80) that is rotatable relative to the hollow torque transmitting member (72), and a housing (114) for accommodating the torque sensor (80).

According to an embodiment of the present invention, the housing (114) has a recess (120), disposed on an inside at an end portion thereof, for accommodating the first member (116); and the protrusion (122) of the hollow torque transmitting member (72), the housing (114), and the first member (116) together position and fix the torque sensor (80).

According to an embodiment of the present invention, the one-way clutch (78) includes a clutch inner (138), a clutch outer (140), and a ratchet (142) for engaging the clutch inner (138) and the clutch outer (140); and the clutch inner (138) is disposed on a side of the crankshaft (38) and the clutch outer (140) is disposed on a side of the hollow torque transmitting member (72).

According to an embodiment of the present invention, an output unit (36) is provided for outputting to the drive wheel (WR) the pedaling torque applied to the crankshaft (38) and transmitted via the one-way clutch (78). An output shaft (108) is provided for outputting a driving force of the motor (50) to the drive wheel (WR). In the bicycle (10), the crankshaft (38), a drive shaft (56) of the motor (50), and the output shaft (108) are disposed in sequence from a front side of the bicycle (10) with the output unit (36) being disposed along the crankshaft (38). The one-way clutch (78) and the torque sensor (80) are disposed in sequence from a side opposite to the output unit (36).

According to an embodiment of the present invention, an output unit (36) is provided for outputting to the drive wheel (WR) the pedaling torque applied to the crankshaft (38) and transmitted via the one-way clutch (78). An output shaft (108) is provided for outputting a driving force of the motor (50) to the drive wheel (WR). In the bicycle, the crankshaft (38), a drive shaft (56) of the motor (50), and the output shaft (108) are disposed in sequence from a front side of the bicycle (10) with the output unit (36) being disposed along the crankshaft (38). The one-way clutch (78) and the torque sensor (80) are disposed in sequence from a side of the output unit (36).

According to an embodiment of the present invention, the magnetic film is formed in the recess disposed in the outer periphery of the hollow torque transmitting member. The torque sensor is positioned and fixed by the support member for supporting the torque sensor rotatably relative to the hollow torque transmitting member at both ends of the recess such that the torque sensor faces the magnetic film in the recess. This inhibits the magnetic film and the torque sensor from being misaligned relative to each other, contributing to stabilized detection accuracy. In addition, detection accuracy of the torque sensor can be improved by simply positioning and fixing the torque sensor only in the hollow torque transmitting member.

According to an embodiment of the present invention, the protrusion of the hollow torque transmitting member and the support member are abutted on each other to thereby position and fix the torque sensor. This allows the position of the protrusion to serve as a reference for the support member, so that a positional relationship between the magnetic film disposed in the hollow torque transmitting member and the torque sensor can be easily defined.

According to an embodiment of the present invention, the support member includes the first member and the second member disposed on either end side of the torque sensor that is rotatable relative to the hollow torque transmitting member, and the housing for accommodating the torque sensor. This allows the support member to be divided into parts, thus improving assemblability.

According to an embodiment of the present invention, the housing has the recess, disposed on the inside at an end portion thereof, for accommodating the first member; and the protrusion of the hollow torque transmitting member, the housing, and the first member together position and fix the torque sensor. This allows the torque sensor to be positioned easily and improves assemblability.

According to an embodiment of the present invention, the clutch inner of the one-way clutch is integrally formed with the crankshaft and the clutch outer of the one-way clutch is disposed on the side of the hollow torque transmitting member. This eliminates the need for having an independent clutch inner, which permits a reduction in the number of parts used and cost.

According to an embodiment of the present invention, the support member and other parts associated with the torque sensor can be disposed in spaces where the motor is not disposed, which helps shorten the motor shaft.

According to an embodiment of the present invention, the one-way clutch can be disposed at a position so as not to interfere with the motor and the gap between the crankshaft and the drive shaft of the motor can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An actuator system according to a preferred embodiment of the present invention will be described below in detail with reference to the accompanying drawings.

Figure 1:
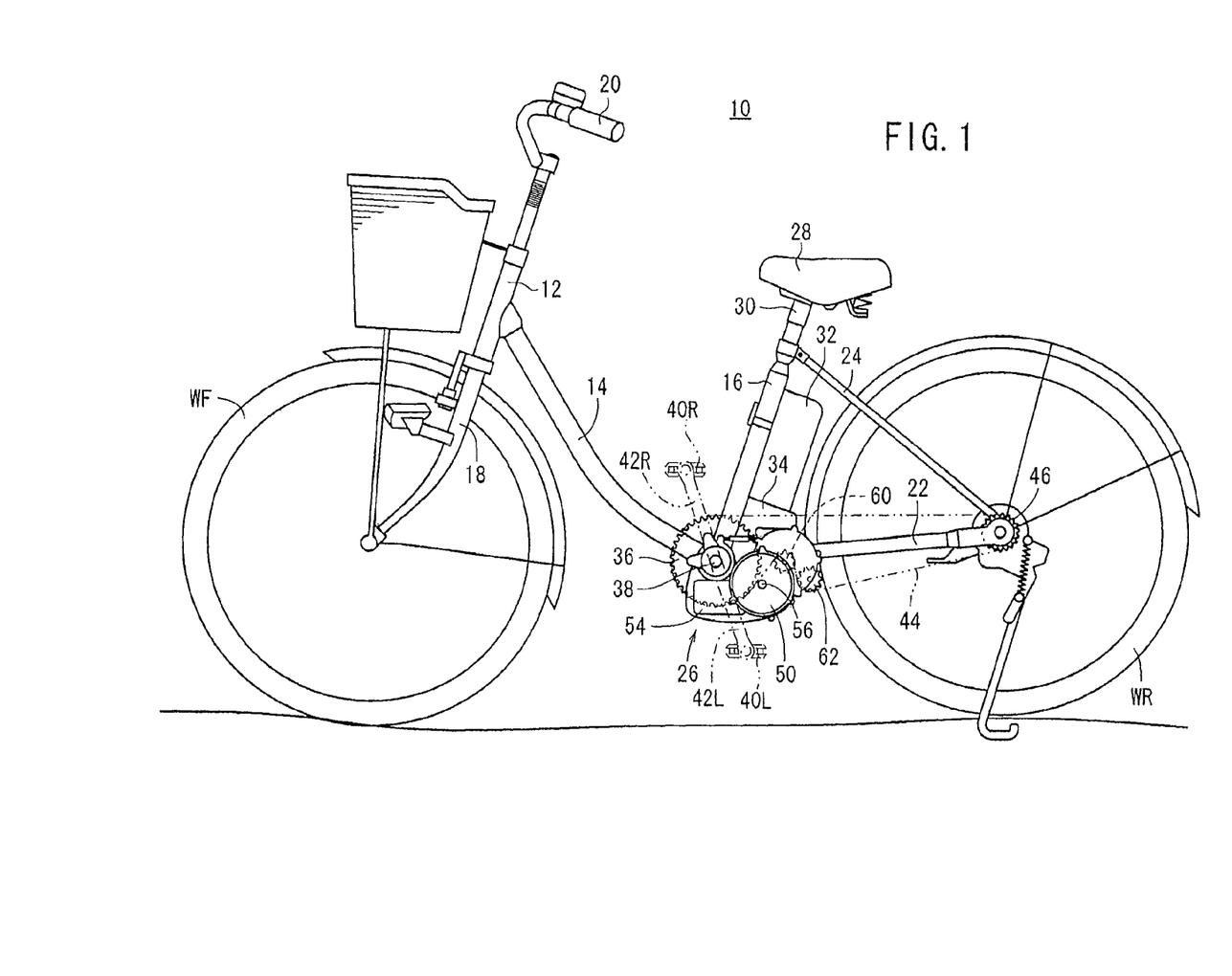
FIG. 1 is a left side elevational view showing a power-assisted bicycle including an actuator system.
Figure 2:
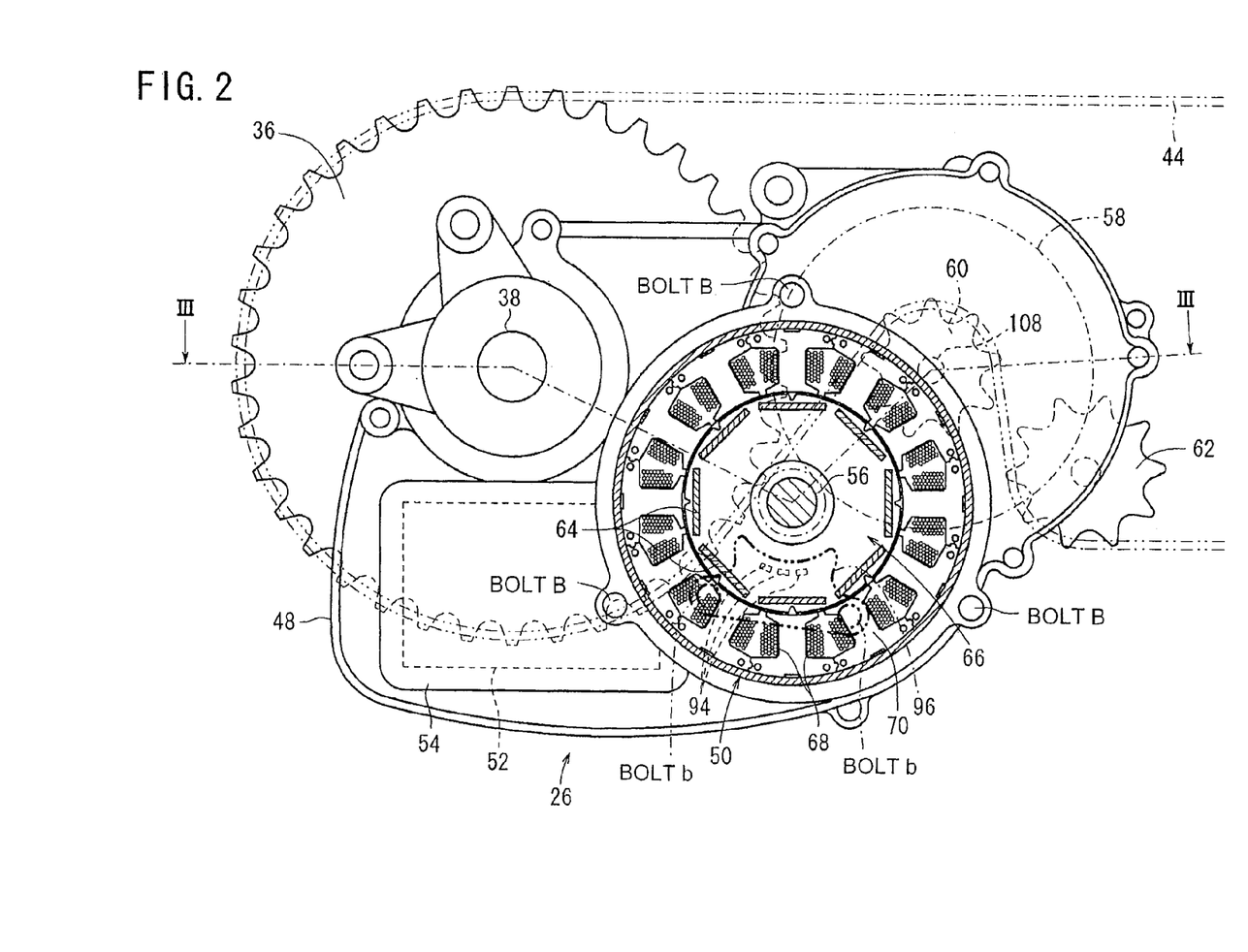
FIG. 2 is a left side elevational view showing a main part of the power-assisted bicycle shown in FIG. 1.
Figure 3:
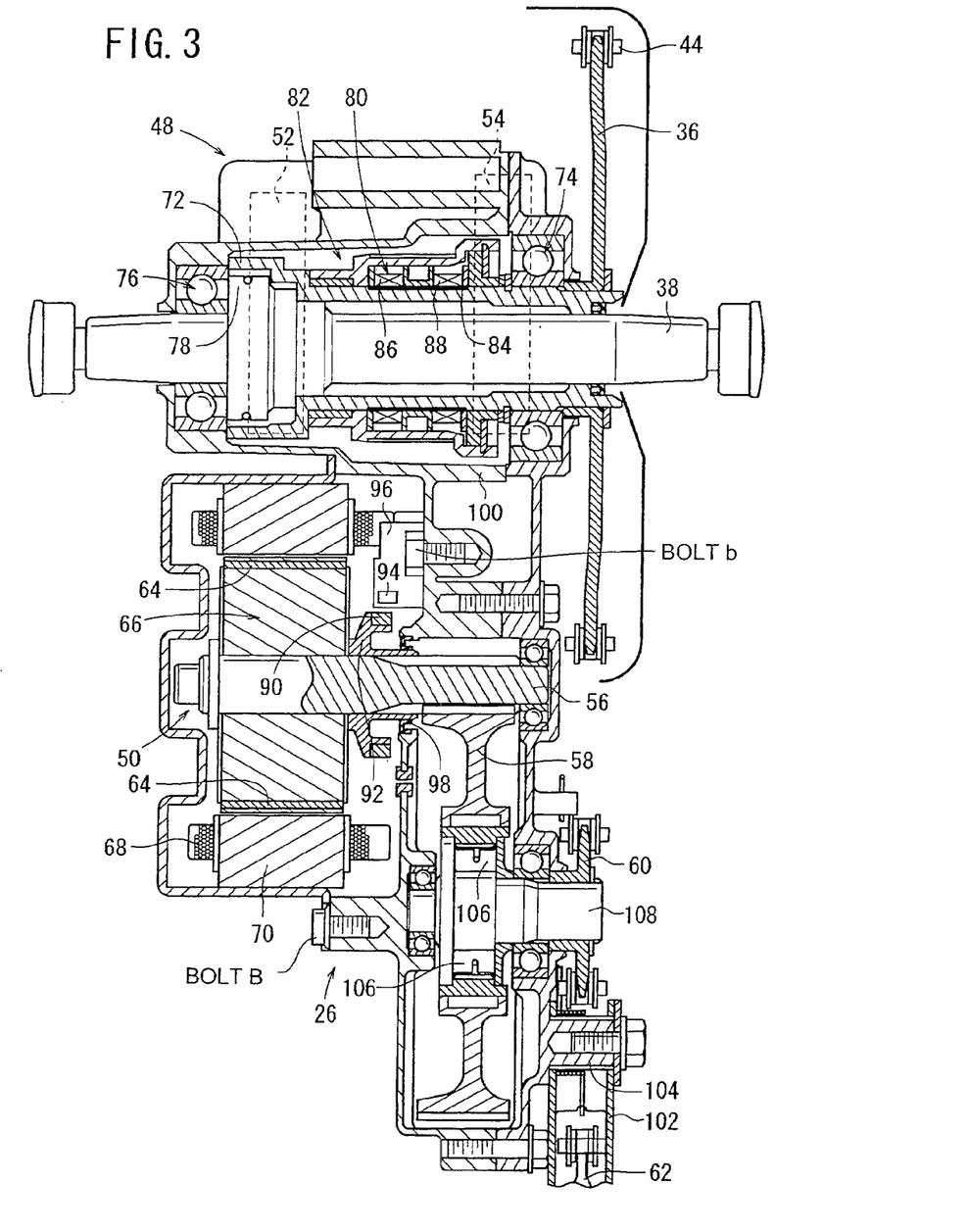
FIG. 3 is a cross-sectional view taken along line III-III of FIG. 2.

FIG. 1 is a left side elevational view showing a bicycle with an auxiliary power unit (a power-assisted bicycle) 10. FIG. 2 is a left side elevational view showing a main part of the power-assisted bicycle 10 shown in FIG. 1. FIG. 3 is a cross-sectional view taken along line III-III of FIG. 2. The power-assisted bicycle 10 generally includes a head pipe 12, a down frame 14, and a seat pipe 16. More specifically, the head pipe 12 is disposed forwardly of a bicycle body. The down frame 14 extends rearwardly and downwardly from the head pipe 12. The seat pipe 16 rises upwardly from a rear end of the down frame 14. A front fork 18 extends downwardly and is steerably connected to the head pipe 12. The front fork 18 includes a lower end that journals a front wheel WF. A handlebar 20 is disposed upwardly of the head pipe 12.

A rear fork 22 extending rearwardly is disposed at a rear end of the down frame 14. A rear wheel (drive wheel) WR is journaled at a rear end of the rear fork 22. In addition, a pair of left and right stays 24 is disposed between an upper portion of the seat pipe 16 and a rear portion of the rear fork 22.

The down frame 14 and the rear fork 22 support an assist drive unit 26. A seat post 30 having a seat 28 at an upper end thereof is mounted on the seat pipe 16 so as to permit vertical adjustment of the position of the seat 28. A battery 32 for supplying the assist drive unit 26 with electric power is removably mounted on a stay 34 of the seat pipe 16 rearwardly of the seat pipe 16.

A crankshaft 38 extending in a width direction of the bicycle body penetrates through the assist drive unit 26 and a sprocket (output unit) 36. A crank 42L having a pedal 40L and a crank 42R having a pedal 40R are connected to either side of the crankshaft 38. When a rider pedals the pedals 40L, 40R, a pedaling torque (power) is applied to the crankshaft 38. The sprocket 36 is rotated because of the pedaling torque applied to the crankshaft 38. The rotation of the sprocket 36 is transmitted to a sprocket 46 on the side of the rear wheel WR, which rotates the rear wheel WR. The sprocket 36, a chain 44, and the sprocket 46 function as a drive system mechanism.

The assist drive unit 26 integrally holds, within a housing (case) 48 thereof, a brushless motor 50, a motor driver 52, a controller (control means) 54, a drive gear 58, an output shaft 108, and an assist sprocket 60. The motor driver 52 drives the brushless motor 50. The controller (control means) 54 performs a PWM control of the motor driver 52, calculation of a torque value based on a detection made by a magnetostrictive torque sensor (torque sensor) to be described later, and other functions. The drive gear 58 rotates in mesh with a drive shaft 56 of the brushless motor 50. The output shaft 108 rotates according to the rotation of the drive gear 58. The assist sprocket 60 rotates integrally with the output shaft 108. The chain 44 is trained over the assist sprocket 60. The assist drive unit 26 transmits a driving force of the brushless motor 50 to the drive system mechanism.

The controller 54 performs the PWM control of the motor driver 52 such that the brushless motor 50 generates assist torque defined by an assist ratio that corresponds to the pedaling torque applied to the crankshaft 38 and a bicycle speed of the power-assisted bicycle 10. The motor driver 52 includes switching devices for a plurality of phases (three phases of U-phase, V-phase, and W-phase in the preferred embodiment of the present invention). The controller 54 performs the PWM control of the motor driver 52 by controlling to turn ON or OFF each of the switching devices for U-phase, V-phase, and W-phase at a determined duty ratio. Through the PWM control, the motor driver 52 converts DC power from the battery 32 to three-phase AC power, thus supplying a three-phase AC current to a U-phase stator coil, a V-phase stator coil, and a W-phase stator coil of the brushless motor 50. This rotates the drive shaft 56 of the brushless motor 50. The controller 54 has a clock circuit, thus functioning as a timer.

The assist torque generated by the brushless motor 50 is transmitted to the output shaft 108 via the drive shaft 56 and the drive gear 58. The assist torque transmitted to the output shaft 108 is transmitted to the chain 44 via the assist sprocket 60. Pedaling of the pedals 40L, 40R by the rider therefore results in the pedaling torque (driving force) applied to the crankshaft 38 and the assist torque generated by the brushless motor 50 being transmitted to the sprocket 46 on the side of the rear wheel WR via the chain 44, thereby rotating the rear wheel WR. To allow a large winding angle for the chain 44, an idler 62 is disposed rearwardly of the assist sprocket 60.

The brushless motor 50 includes a rotor 66 and a stator 70. The rotor 66 has a total of eight N-pole and S-pole permanent magnets 64 disposed alternately in a circumferential direction. The stator 70 has stator windings 68 disposed in radially opposed positions so as to surround an outer peripheral portion of the rotor 66. The stator windings 68 of three phases of U-phase, V-phase, and W-phase generate a rotational magnetic field to rotate the rotor 66. The drive shaft 56 is disposed on a rotary shaft of the rotor 66. Since there are a total of 12 stators 70, there are four each of the U-phase stator windings 68, the V-phase stator windings 68, and the W-phase stator windings 68. Stator coils of the brushless motor 50 are formed as follows. More specifically, a U-phase stator coil is formed of four U-phase stator windings 68, a V-phase stator coil is formed of four V-phase stator windings 68, and a W-phase stator coil is formed of four W-phase stator windings 68.

The assist drive unit 26 includes a mechanism that allows the sprocket 36 to rotate when the pedals 40L, 40R are pedaled in a direction in which the power-assisted bicycle 10 moves in a forward direction (forward direction) and prevents the sprocket 36 from rotating when the pedals 40L, 40R are pedaled in a direction opposite to the forward direction (backward direction). More specifically, referring to FIG. 3, the assist drive unit 26 includes a hollow member (hollow torque transmitting member) 72, a bearing unit 74, a bearing unit 76, and a one-way clutch 78. More specifically, the hollow member 72 is inserted over an outer periphery of the crankshaft 38. The bearing unit 74 is disposed between the hollow member 72 and the housing 48. The bearing unit 76 is disposed between the crankshaft 38 and the housing 48. The one-way clutch 78 is disposed between the crankshaft 38 and the hollow member 72. The one-way clutch 78 is structured so as to transmit rotation of the crankshaft 38 to the hollow member 72 when the pedals 40L, 40R are pedaled in the forward direction and not to transmit the rotation of the crankshaft 38 to the hollow member 72 when the pedals 40L, 40R are pedaled in the backward direction. Splines are formed on the right of the hollow member 72. The sprocket 36 is mounted on the hollow member 72 in a spline fit.

When the pedals 40L, 40R are pedaled in the forward direction, the crankshaft 38 rotates and, through the functioning of the one-way clutch 78, the hollow member 72 rotates. This results in the sprocket 36 rotating. When the pedals 40L, 40R are pedaled in the backward direction, on the other hand, the hollow member 72 does not rotate through the functioning of the one-way clutch 78, though the crankshaft 38 rotates. As a result, the sprocket 36 is not rotated even when the pedals 40L, 40R are pedaled in the backward direction.

A magnetostrictive torque sensor 80 that detects the pedaling torque applied to the crankshaft 38 is disposed on the crankshaft 38. More specifically, the magnetostrictive torque sensor 80 is disposed on the outer periphery of the hollow member 72 through a support member 82. The hollow member 72 includes a magnetic film 84 and the support member 82 supports the magnetostrictive torque sensor 80 rotatably relative to the hollow member 72 such that the magnetostrictive torque sensor 80 faces the magnetic film 84. The magnetostrictive torque sensor 80 includes two detecting coils 86, 88. The magnetostrictive torque sensor 80 translates a change in inductance in each of the detecting coils 86, 88 produced by magnetostriction generated when the hollow member 72 rotates to a corresponding voltage and outputs the voltage to the controller 54. The hollow member 72 does not rotate when the pedals 40L, 40R are pedaled in the backward direction, so that the magnetostrictive torque sensor 80 detects no pedaling torque applied to the crankshaft 38.

A magnet holder 92 for holding a magnet 90 is disposed on the drive shaft 56 of the brushless motor 50, rotating with the rotor 66. Three Hall ICs 94 (see FIG. 2) for detecting the magnet 90 are disposed so as to face the magnet 90. The three Hall ICs 94 detect a phase angle and a rotating speed of the rotor 66. The Hall ICs 94 are held in place by a Hall IC housing 96. The Hall IC housing 96 is attached to an inside of the housing 48 of the assist drive unit 26 with a bolt b. There are a total of eight magnets 90 disposed in a circumferential direction, N-pole magnets 90 and S-pole magnets 90 being alternately disposed. The magnets 90 and the Hall ICs 94 function as a magnetic pole sensor for detecting the phase angle of the brushless motor 50.

The brushless motor 50 and the drive gear 58 are housed in respective spaces defined one from the other. A dust seal 98 is disposed on an outer periphery of the magnet holder 92. The dust seal 98 prevents dust and other foreign matter from entering the space in which the brushless motor 50 is disposed from the space in which the drive gear 58 is disposed. A cover for protecting the brushless motor 50 is attached to the housing 48 of the assist drive unit 26 with a bolt B along an outer periphery of the brushless motor 50.

The housing 48 has a partition plate 100 with which to define spaces within. The motor driver 52, the controller 54, and the magnetostrictive torque sensor 80 are disposed in a single space. The brushless motor 50 is disposed and housed in a space rearward and downward of the crankshaft 38 and defined from that for the magnetostrictive torque sensor 80. The motor driver 52 and the controller 54 are disposed downwardly of the magnetostrictive torque sensor 80.

While the magnetostrictive torque sensor 80 and the brushless motor 50 are housed in respective spaces defined one from the other, the magnetostrictive torque sensor 80 and the brushless motor 50 are close to each other. Though not shown, the motor driver 52 and the controller 54 are fixed to a wall of the housing 48 and to left and right facing walls, respectively. The controller 54 is disposed on a wall surface of the housing 48 on the side of the magnetostrictive torque sensor 80.

The idler 62 is journaled on a support arm 102 and a pivot 104 oscillatably journals the support arm 102. The support arm 102 journaled on the pivot 104 is urged by a torsion spring such that the idler 62 presses the chain 44.

A one-way clutch 106 is disposed between the output shaft 108 of the assist sprocket 60 and the drive gear 58. Only when the drive gear 58 rotates in the forward direction (in which the power-assisted bicycle 10 travels forward), the one-way clutch 106 transmits the rotation to the output shaft 108. Accordingly, only when the rotor 66 of the brushless motor 50 rotates in the forward direction, the assist sprocket 60 rotates, so that the assist torque generated by the brushless motor 50 is transmitted to the sprocket 46 on the rear wheel WR side via the chain 44.

Figure 4:
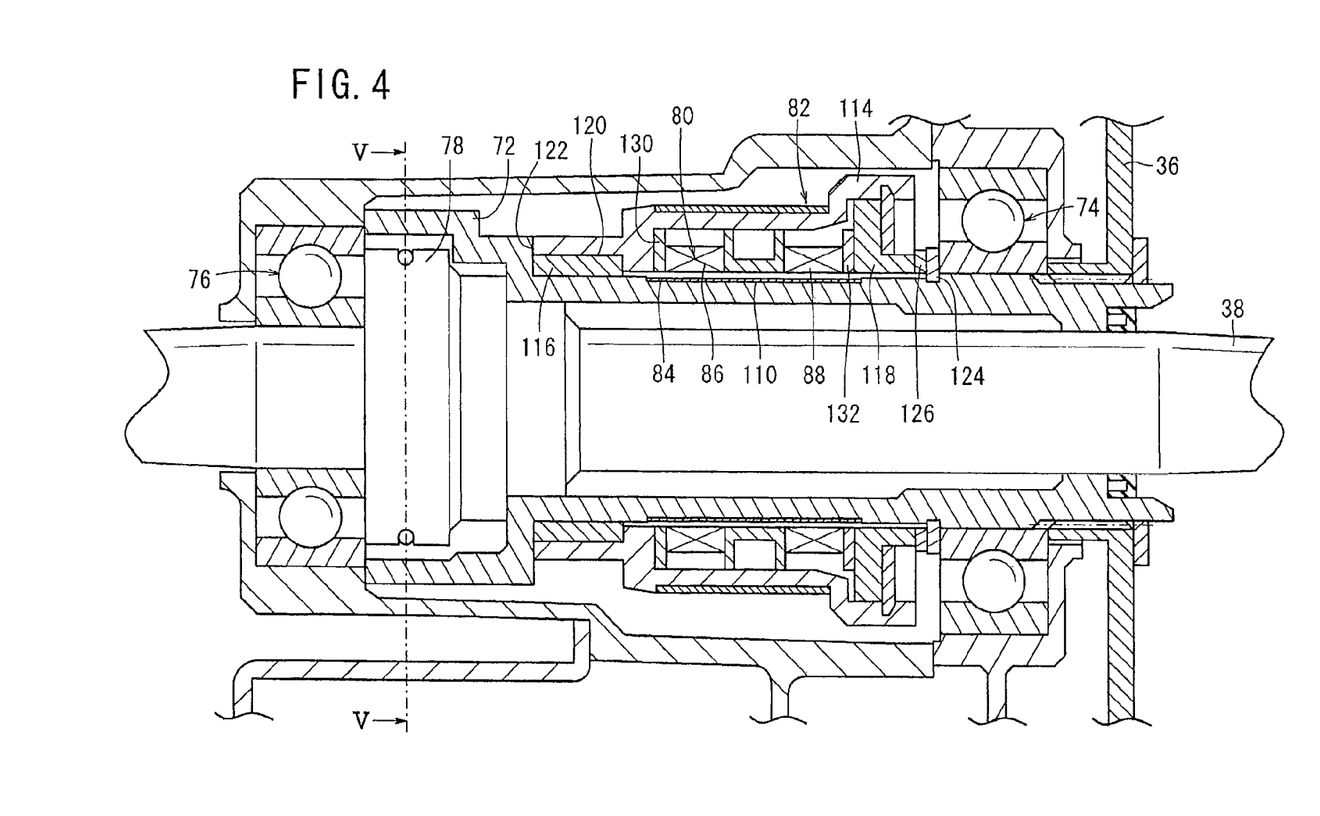
FIG. 4 is an enlarged view of a main part of the cross-sectional view taken along line III-III shown in FIG. 2.

FIG. 4 is an enlarged view of a main part of the cross-sectional view taken along line III-III shown in FIG. 2. The hollow member 72 has a recess 110 formed therein and the magnetic film 84 is formed in the recess 110. The support member 82 supports the magnetostrictive torque sensor 80 rotatably relative to the hollow member 72 at both ends of the recess 110 such that the magnetostrictive torque sensor 80 is disposed so as to face the magnetic film 84. More specifically, the magnetostrictive torque sensor 80 is positioned and fixed by the support member 82 so as to be positioned to face the magnetic film 84.

The support member 82 includes a housing 114 that accommodates the magnetostrictive torque sensor 80, a bearing (a first member) 116, and a bearing (a second member) 118. The housing 114 has a recess 120 disposed on an inside at an end portion thereof. The recess 120 accommodates the bearing 116 (such that the bearing 116 abuts on the hollow member 72 at the end portion). The hollow member 72 has a protrusion 122. The protrusion 122, the housing 114, and the bearing 116 position and fix a first end of the magnetostrictive torque sensor 80. More specifically, the protrusion 122, the housing 114, and the bearing 116 abut on one another to position and fix the first end of the magnetostrictive torque sensor 80. The protrusion 122 of the hollow member 72 and the support member 82 are abutted on each other in this manner, which positions and fixes the magnetostrictive torque sensor 80. The position of an end face of the protrusion 122 (in abutment with the support member 82) can therefore be made to serve as a reference position for the support member 82.

The detecting coil 86 of the magnetostrictive torque sensor 80 abuts on the housing 114 via a shield washer 130 and the detecting coil 88 of the magnetostrictive torque sensor 80 abuts on the bearing 118 via a shield washer 132. The recess 120 is formed on a side of the housing 114 on which the detecting coil 86 is disposed. The magnetostrictive torque sensor 80 is cylindrically shaped and the housing 114 is shaped into a cylinder that covers a first side surface and an upper surface of the magnetostrictive torque sensor 80 and opens a second side surface of the magnetostrictive torque sensor 80. The detecting coil 86 abuts on the housing 114 via the shield washer 130 at the first side surface and the bearing 118 is disposed on the second side surface.

The bearing 118 disposed on a side opposite to a side on which the bearing 116 in the housing 114 is accommodated abuts on the bearing unit 74 via a circlip 124 and a washer 126. Note that a coned disc spring may be disposed between the bearing 118 and the bearing unit 74. This positions and fixes a second end of the magnetostrictive torque sensor 80. Further, the bearing 116 and the bearing 118 allow the magnetostrictive torque sensor 80 to be rotatable relative to the hollow member 72.

Figure 5:
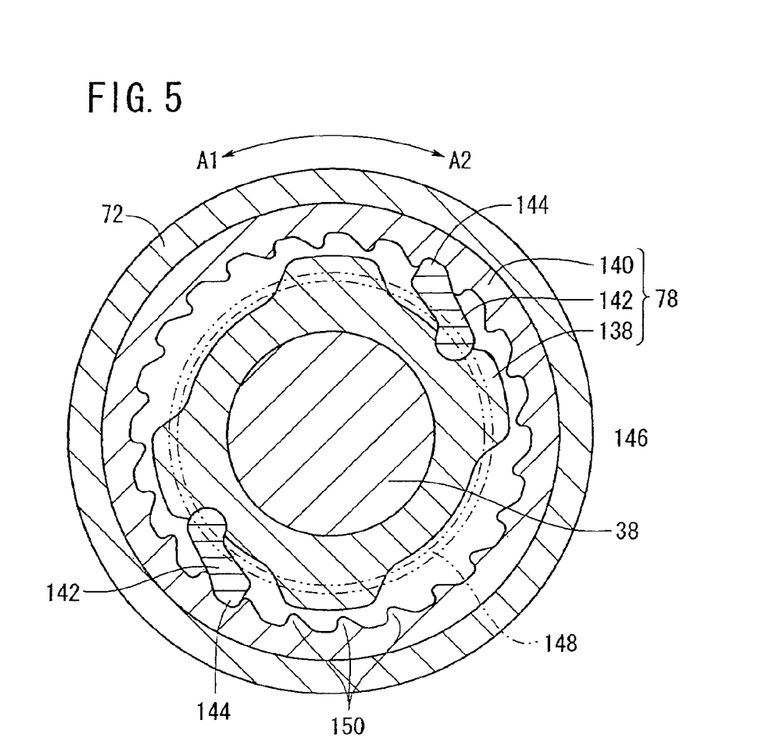
FIG. 5 is a partial cross-sectional view taken along line V-V of FIG. 4.

FIG. 5 is a partial cross-sectional view taken along line V-V of FIG. 4. The crankshaft 38 and the hollow member 72 are engaged with each other via the one-way clutch 78. The one-way clutch 78 includes a clutch inner 138, a clutch outer 140, and a pair of ratchets 142. The clutch inner 138 is disposed on an outer periphery of the crankshaft 38 in a flange-like manner. The clutch inner 138 and the crankshaft 38 are integrally formed. The one-piece molding permits reduction in the number of parts used and cost. The clutch outer 140 is disposed on an inner periphery of the hollow member 72. The pair of ratchets 142 is disposed on the clutch inner 138. The pair of ratchets 142 has end portions 144 urged outwardly by a spring 148. Note that only the clutch outer 140 may be integrally formed with the hollow member 72. Alternatively, the clutch inner 138 and the crankshaft 38, and the clutch outer 140 and the hollow member 72, may be integrally formed, respectively.

The clutch outer 140 includes a plurality of locking portions 150. The locking portions 150 have the following function: when the clutch inner 138 rotates in a direction of an arrow Al (in which the power-assisted bicycle 10 travels forward) relative to the clutch outer 140, the locking portions 150 lock the end portions 144 of the ratchets 142; and when the clutch inner 138 rotates in a direction of an arrow A2 (in which the power-assisted bicycle 10 does not travel forward) relative to the clutch outer 140, the locking portions 150 do not lock the ratchets 142.

When the pedals 40L, 40R are pedaled in a direction in which the power-assisted bicycle 10 moves in a forward direction, the crankshaft 38 rotates in the direction of the arrow Al, so that the clutch inner 138 and the clutch outer 140 rotate integrally. In contrast, when the pedals 40L, 40R are pedaled in a direction opposite to the direction in which the power-assisted bicycle 10 moves in the forward direction, the crankshaft 38 rotates in the direction of the arrow A2, so that only the clutch inner 138 rotates and the clutch outer 140 does not rotate.

Figure 6:
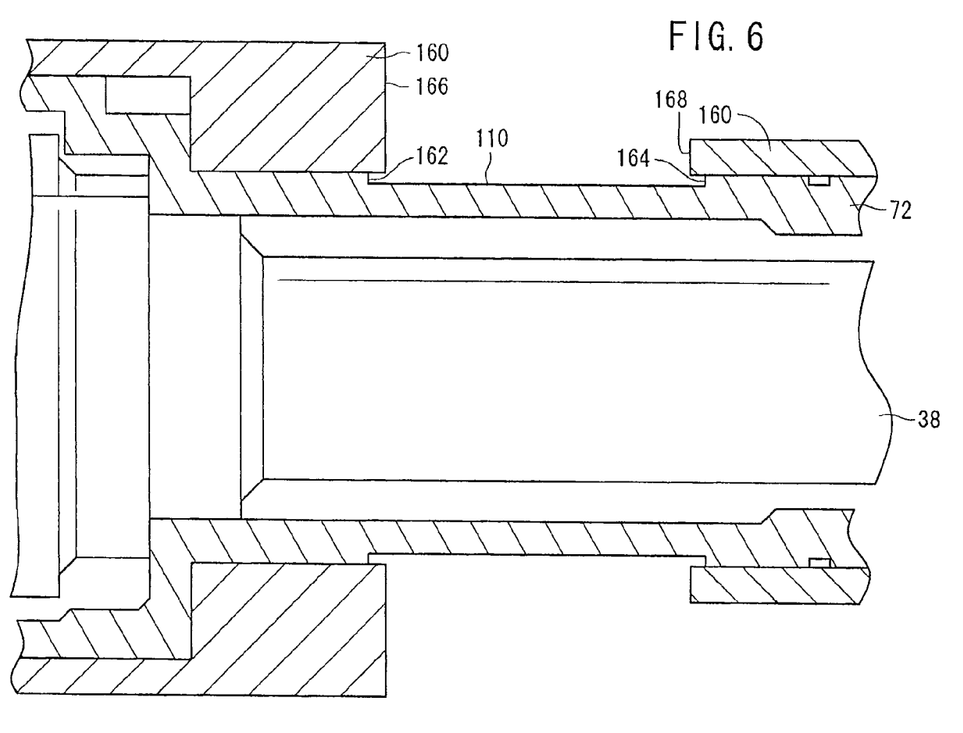
FIG. 6 is an illustration for illustrating a method of masking a recess in a hollow member with a magnetic film.

FIG. 6 is an illustration for illustrating a method of masking the recess 110 in the hollow member 72 with the magnetic film 84. A masking member 160 is disposed so as to ensure that a magnetic material masks only an area of the recess 110 that is to be masked. At this time, the masking member 160 is made to overhang a predetermined amount over the side of the recess 110. More specifically, the masking member 160 is disposed such that end faces 166, 168 of the masking member 160 protrude to the side of the recess 110 relative to end faces 162, 164 of the recess 110. A masking process is then performed with the masking member 160 disposed in the overhung position.

If the masking process is performed with the masking member 160 not in the overhung condition, specifically, if the masking process is performed with the end faces 166, 168 of the masking member 160 aligned with the end faces 162, 164 of the recess 110, the magnetic material stagnates at square corners formed between the end faces 162, 164 of the recess 110 and a bottom surface of the recess 110. This hampers the magnetic film 84 from being formed with a uniform thickness in the recess 110.

However, having the masking member 160 overhung over the side of the recess 110 as shown in FIG. 6, prevents the magnetic material from stagnating at the square corners formed between the end faces 162, 164 of the recess 110 and the bottom surface of the recess 110, so that the magnetic film 84 with a uniform thickness can be formed in the recess 110. More specifically, by making the masking member 160 overhang, an excess magnetic material flows into gaps formed by the masking member 160 and the recess 110, which allows the magnetic film 84 with a uniform thickness to be formed in the recess 110.

In the preferred embodiment of the present invention, the magnetostrictive torque sensor 80 is positioned and fixed by the support member 82 that supports the magnetostrictive torque sensor 80 rotatably relative to the hollow member 72 at both ends of the recess 110 such that the magnetostrictive torque sensor 80 is disposed so as to face the magnetic film 84. This inhibits the magnetic film 84 and the magnetostrictive torque sensor 80 from being misaligned relative to each other, contributing to stabilized detection accuracy. In addition, the detection accuracy of the magnetostrictive torque sensor 80 can be improved by simply positioning and fixing the magnetostrictive torque sensor 80 only in the hollow member 72.

The magnetostrictive torque sensor 80 is positioned and fixed by disposing the protrusion 122 of the hollow member 72 in abutment with the support member 82. This allows the position of the protrusion 122 to serve as the reference for the support member 82, so that a positional relationship between the magnetic film 84 disposed in the hollow member 72 and the magnetostrictive torque sensor 80 can be easily defined.

The support member 82 is composed of the bearings 116, 118 disposed on either end of the magnetostrictive torque sensor 80 that is rotatable relative to the hollow member 72, and the housing 114. This allows the support member 82 to be divided into parts, thus improving assemblability.

The housing 114 has the recess 120 disposed on the inside at an end portion thereof, the recess 120 for accommodating therein the bearing 116. The magnetostrictive torque sensor 80 is positioned and fixed by the protrusion 122 of the hollow member 72, the housing 114, and the bearing 116. This allows the magnetostrictive torque sensor 80 to be positioned easily and improves assemblability.

The preferred embodiment of the present invention as described heretofore may be modified as follows. In the preferred embodiment of the present invention, the one-way clutch 78 and the magnetostrictive torque sensor 80 are disposed along the crankshaft 38 in that order from a side opposite to a side on which the sprocket 36 is disposed. However, the one-way clutch 78 and the magnetostrictive torque sensor 80 may still be disposed along the crankshaft 38 in that order from the side on which the sprocket 36 is disposed.

Figure 7:
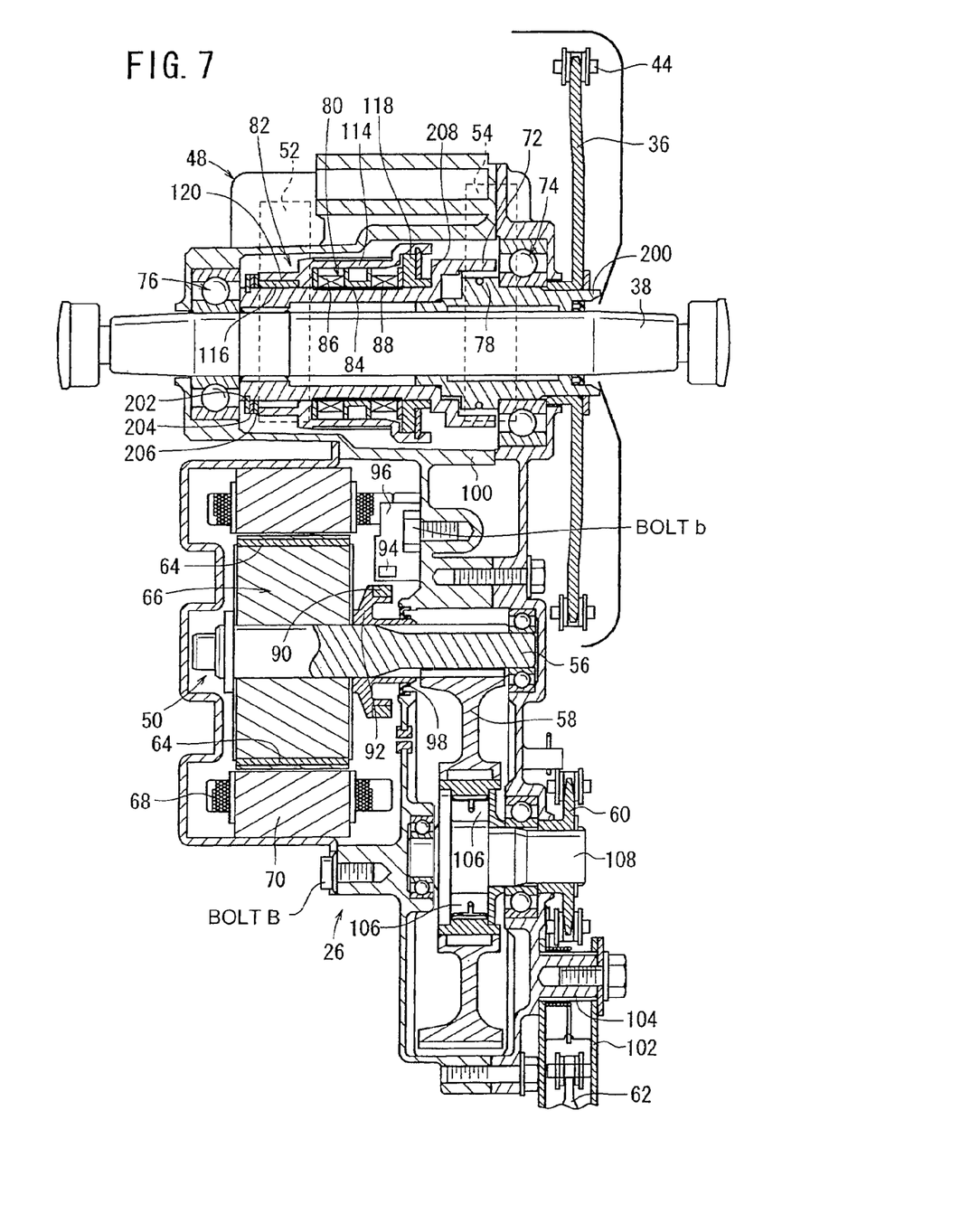
FIG. 7 is a cross-sectional view taken along line III-III of FIG. 2 in a modified example.

FIG. 7 is a cross-sectional view taken along line III-III of FIG. 2 in a modified example. In FIG. 7, like or corresponding parts are identified by the same reference numerals as those used in FIG. 3 and only differences from those shown in FIG. 3 will be described. Splines are formed on a left end of the crankshaft 38. The hollow member 72 is mounted on the crankshaft 38 in a spline fit at a left end thereof. The magnetostrictive torque sensor 80 is disposed on the hollow member 72. The magnetostrictive torque sensor 80 is supported by the support member 82 rotatably relative to the hollow member 72 at both ends of the recess 110. The one-way clutch 78 is disposed between a right side portion of the hollow member 72 and a left side portion of a cylindrical member 200 inserted over the left side of the crankshaft 38. Splines are formed on a right side portion of the cylindrical member 200. The sprocket 36 is mounted on the cylindrical member 200 in a spline fit at the right side portion of the cylindrical member 200. The clutch inner 138 of the one-way clutch 78 may be integrally formed with the cylindrical member 200, or the clutch outer 140 of the one-way clutch 78 may be integrally formed with the hollow member 72.

When the pedals 40L, 40R are pedaled in the forward direction, the crankshaft 38 rotates. The rotation of the crankshaft 38 causes the hollow member 72 to rotate and, through the one-way clutch 78, causes the cylindrical member 200 to rotate. This causes the sprocket 36 to rotate. When the pedals 40L, 40R are pedaled in the backward direction, on the other hand, the crankshaft 38 rotates. The rotation of the crankshaft 38 causes the hollow member 72 to rotate; however, the cylindrical member 200 and the sprocket 36 do not rotate because of functioning of the one-way clutch 78.

A circlip 202 is disposed on the left end of the hollow member 72. The housing 114 and the bearing 116 abut on the circlip 202 via a coned disc spring 204 and a washer 206. This results in a first end of the magnetostrictive torque sensor 80 being positioned and fixed by the support member 82. In addition, the hollow member 72 has a protrusion 208. The bearing 118 abuts on the protrusion 208 to thereby position and fix a second end of the magnetostrictive torque sensor 80.

The sprocket 36, the one-way clutch 78, and the magnetostrictive torque sensor 80 are disposed in that order from the side on which the sprocket 36 is disposed in this manner, which helps shorten a gap between the crankshaft 38 and the drive shaft 56. More specifically, the portion at which the one-way clutch 78 is disposed tends to be large in diameter. If the one-way clutch 78 is disposed at a position in an axial direction of the crankshaft 38 at which the one-way clutch 78 interferes with the brushless motor 50 (see FIG. 3). Therefore, the brushless motor 50 needs to be displaced rearwardly and the gap between the crankshaft 38 and the drive shaft 56 of the brushless motor 50 is longer.

Referring to FIG. 7, if the one-way clutch 78 is displaced axially along the crankshaft 38 so as not to interfere with the brushless motor 50, the gap between the crankshaft 38 and the drive shaft 56 of the brushless motor 50 can be shortened to thereby achieve a reduction in size of the assist drive unit 26. Referring to FIG. 3, on the other hand, if the one-way clutch 78 and the magnetostrictive torque sensor 80 are disposed in that order from the side on which the sprocket 36 is disposed, the gap between the crankshaft 38 and the drive shaft 56 is made to be long to prevent the one-way clutch 78 from interfering with the brushless motor 50. The arrangement yet contributes to a smaller dimension in a bicycle width direction and a shorter drive shaft 56 of the brushless motor 50.

Preferred embodiments of the present invention have been presented for the purposes of illustration and description. They are not intended to be exhaustive or to limit the invention to the precise forms disclosed. It will be understood by those skilled in the art that various changes in form and detail may be made therein without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle with an auxiliary power unit including control means for controlling an output of a motor according to a torque value of a pedaling torque applied to a crankshaft, as detected by a torque sensor, the bicycle comprising:

an annular hollow torque transmitting member inserted over an outer periphery of the crankshaft; and a one-way clutch, disposed on the hollow torque transmitting member, for transmitting the pedaling torque to a drive wheel when the pedaling torque, in a direction in which the bicycle with the auxiliary power unit traveling in a forward direction, is applied to the crackshaft;

wherein a magnetic film is formed in a recess disposed in an outer periphery of the hollow torque transmitting member; and a support member for positioning and fixing the torque sensor and for rotatably supporting the torque sensor relative to the hollow torque transmitting member at end portions of the recess such that the torque sensor faces the magnetic film in the recess.

2. The bicycle with an auxiliary power unit according to claim 1, wherein
the hollow torque transmitting member includes a projection disposed on a first end thereof; and
the projection and the support member abut each other to thereby position and fix the torque sensor.

3. The bicycle with an auxiliary power unit according to claim 2, wherein the support member includes a first member and a second member disposed on an end side of the rotatable torque sensor which is rotatable relative to the hollow torque transmitting member, and a housing is provided for accommodating the torque sensor.

4. The bicycle with an auxiliary power unit according to claim 3, wherein
the housing has a recess, annularly disposed on an inside end portion thereof, for accommodating the first member; and
the projection of the hollow torque transmitting member, the housing, and the first member together position and fix the torque sensor.

5. The bicycle with an auxiliary power unit according to claim 2, wherein
the one-way clutch includes a clutch inner, a clutch outer, and a ratchet for engaging the clutch inner and the clutch outer; and
the clutch inner is integrally formed with the crankshaft and the clutch outer is disposed on a side of the hollow torque transmitting member.

6. The bicycle with an auxiliary power unit according to claim 2, and further comprising:
an output unit for outputting to the drive wheel the pedaling torque applied to the crankshaft and transmitted via the one-way clutch; and
an output shaft for outputting a driving force of the motor to the drive wheel;
wherein the crankshaft, a drive shaft of the motor, and the output shaft are disposed in sequence from a front side of the bicycle; and
the output unit is disposed along the crankshaft, and the one-way clutch and the torque sensor are disposed in sequence from a side opposite to the output unit.

7. The bicycle with an auxiliary power unit according to claim 1, wherein the support member includes a first member and a second member disposed on an end side of the rotatable torque sensor which is rotatable, relative to the hollow torque transmitting member, and a housing is provided for accommodating the torque sensor.

8. The bicycle with an auxiliary power unit according to claim 7, and further comprising:
an output unit for outputting to the drive wheel the pedaling torque applied to the crankshaft and transmitted via the one-way clutch; and
an output shaft for outputting a driving force of the motor to the drive wheel;
wherein the crankshaft, a drive shaft of the motor, and the output shaft are disposed in sequence from a front side of the bicycle; and
the output unit is disposed along the crankshaft, and the one-way clutch and the torque sensor are disposed in sequence from a side of the output unit.

9. The bicycle with an auxiliary power unit according to claim 1, wherein
the one-way clutch includes a clutch inner, a clutch outer, and a ratchet for engaging the clutch inner and the clutch outer; and
the clutch inner is integrally formed with the crankshaft and the clutch outer is disposed on a side of the hollow torque transmitting member.

10. The bicycle with an auxiliary power unit according to claim 1, and further comprising:
an output unit for outputting to the drive wheel the pedaling torque applied to the crankshaft and transmitted via the one-way clutch; and
an output shaft for outputting a driving force of the motor to the drive wheel;
wherein the crankshaft, a drive shaft of the motor, and the output shaft are disposed in sequence from a front side of the bicycle; and
the output unit is disposed along the crankshaft, and the one-way clutch and the torque sensor are disposed in sequence from a side opposite to the output unit.

11. An auxiliary power unit including control means for controlling an output of a motor according to a torque value of a pedaling torque applied to a crankshaft, as detected by a torque sensor, comprising:
an annular hollow torque transmitting member inserted over an outer periphery of the crankshaft; and
a one-way clutch, disposed on the hollow torque transmitting member for transmitting the pedaling torque when the pedaling torque, in a predetermined direction with the auxiliary power unit traveling in a forward direction, is applied to the crankshaft;
wherein a magnetic film is formed in a recess disposed in an outer periphery of the hollow torque transmitting member; and
a support member for positioning and fixing the torque sensor and for rotatably supporting the torque sensor relative to the hollow torque transmitting member at end portions of the recess such that the torque sensor faces the magnetic film in the recess.

12. The auxiliary power unit according to claim 11, wherein
the hollow torque transmitting member includes a projection disposed on a first end thereof; and
the projection and the support member abut each other to thereby position and fix the torque sensor.

13. The auxiliary power unit according to claim 12, wherein the support member includes a first member and a second member disposed on an end side of the rotatable torque sensor which is rotatable, relative to the hollow torque transmitting member, and a housing is provided for accommodating the torque sensor.

14. The auxiliary power unit according to claim 13, wherein
the housing has a recess, annularly disposed on an inside end portion thereof, for accommodating the first member; and
the projection of the hollow torque transmitting member, the housing, and the first member together position and fix the torque sensor.

15. The auxiliary power unit according to claim 12, wherein
the one-way clutch includes a clutch inner, a clutch outer, and a ratchet for engaging the clutch inner and the clutch outer; and
the clutch inner is integrally formed with the crankshaft and the clutch outer is disposed on a side of the hollow torque transmitting member.

16. The auxiliary power unit according to claim 12, and further comprising:

an output unit for outputting the pedaling torque applied to the crankshaft and transmitted via the one-way clutch; and an output shaft for outputting a driving force of the motor; wherein the crankshaft, a drive shaft of the motor, and the output shaft are disposed in sequence; and the output unit is disposed along the crankshaft, and the one-way clutch and the torque sensor are disposed in sequence from a side opposite to the output unit.

17. The auxiliary power unit according to claim 11, wherein the support member includes a first member and a second member disposed on an end side of the rotatable torque sensor which is rotatable, relative to the hollow torque transmitting member, and a housing is provided for accommodating the torque sensor.

18. The auxiliary power unit according to claim 17, and further comprising:

an output unit for outputting the pedaling torque applied to the crankshaft and transmitted via the one-way clutch; and an output shaft for outputting a driving force of the motor; wherein the crankshaft, a drive shaft of the motor, and the output shaft are disposed in sequence; and the output unit is disposed along the crankshaft, and the one-way clutch and the torque sensor are disposed in sequence from a side of the output unit.

19. The auxiliary power unit according to claim 11, wherein the one-way clutch includes a clutch inner, a clutch outer, and a ratchet for engaging the clutch inner and the clutch outer; and the clutch inner is integrally formed with the crankshaft and the clutch outer is disposed on a side of the hollow torque transmitting member.

20. The auxiliary power unit according to claim 11, and further comprising:

an output unit for outputting the pedaling torque applied to the crankshaft and transmitted via the one-way clutch; and an output shaft for outputting a driving force of the motor; wherein the crankshaft, a drive shaft of the motor, and the output shaft are disposed in sequence; and the output unit is disposed along the crankshaft, and the one-way clutch and the torque sensor are disposed in sequence from a side opposite to the output unit.

* * * * *